United States Patent
Iannello et al.

(10) Patent No.: US 10,316,887 B2
(45) Date of Patent: Jun. 11, 2019

(54) LOCKING CONNECTOR ASSEMBLY

(71) Applicant: ILLINOIS TOOL WORKS INC., Glenview, IL (US)

(72) Inventors: Christopher A. J. Iannello, Rolling Meadows, IL (US); Martin J. Nilsen, Hampshire, IL (US); Craig E. Ernst, Jr., Marlboro, NY (US); Michael B. Grimm, Evanston, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 653 days.

(21) Appl. No.: 14/372,471

(22) PCT Filed: Jan. 16, 2013

(86) PCT No.: PCT/US2013/021675
§ 371 (c)(1),
(2) Date: Jul. 16, 2014

(87) PCT Pub. No.: WO2013/109587
PCT Pub. Date: Jul. 25, 2013

(65) Prior Publication Data
US 2014/0341639 A1    Nov. 20, 2014

Related U.S. Application Data

(60) Provisional application No. 61/587,751, filed on Jan. 18, 2012.

(51) Int. Cl.
*F16C 11/00* (2006.01)
*F16C 11/04* (2006.01)
(Continued)

(52) U.S. Cl.
CPC ............ *F16C 11/04* (2013.01); *A44C 5/2066* (2013.01); *F16B 7/00* (2013.01); *A44B 11/2596* (2013.01);
(Continued)

(58) Field of Classification Search
CPC .............. A44C 5/2066; A44B 11/2592; A44B 11/2596; A44B 19/262; A41F 1/006;
(Continued)

(56) References Cited

U.S. PATENT DOCUMENTS

| 796,414 | A | * | 8/1905 | Chayes | ..................... A41F 3/02 24/319 |
|---|---|---|---|---|---|
| 3,979,801 | A | | 9/1976 | Tareau | |

(Continued)

FOREIGN PATENT DOCUMENTS

| EP | 0287060 A1 | 10/1988 |
|---|---|---|
| EP | 2363034 A1 | 9/2011 |

(Continued)

OTHER PUBLICATIONS

ISR and WO for PCT/US2013/021675 dated Jul. 3, 2013.

*Primary Examiner* — Matthew R McMahon
(74) *Attorney, Agent, or Firm* — Quarles & Brady LLP

(57) ABSTRACT

A locking connector assembly is configured to securely connect a first component to a second component. The locking connector assembly may include a female connector having first and second female ends and a longitudinal passage defined therebetween, and a male connector having first and second male ends. Either of the first or second male ends may be configured to mate with the female connector at either the first or second female ends in order to securely connect the male connector to the female connector.

16 Claims, 7 Drawing Sheets

(51) Int. Cl.
*A44C 5/20* (2006.01)
*F16B 7/00* (2006.01)
*A44B 11/25* (2006.01)

(52) U.S. Cl.
CPC ... *F16B 2200/10* (2018.08); *Y10T 403/32606* (2015.01); *Y10T 403/7039* (2015.01)

(58) Field of Classification Search
CPC .......... A41F 1/008; A41F 15/002; A41F 1/00; A41D 2300/30; A41D 2400/44; Y10T 24/2586; Y10T 24/44043; Y10T 24/44051; Y10T 24/4406; Y10T 24/45995; Y10T 403/7039; Y10T 24/2568; Y10T 403/32606; F16B 7/00; F16C 11/04
See application file for complete search history.

(56) References Cited

U.S. PATENT DOCUMENTS

| | | | |
|---|---|---|---|
| 4,054,972 A | 10/1977 | Rowell | |
| 4,502,191 A * | 3/1985 | Savage | A44B 11/2596 24/587.12 |
| 4,578,843 A * | 4/1986 | Lewis | A44B 11/2596 24/319 |
| 4,777,665 A * | 10/1988 | Akamatsu | A41D 25/04 2/155 |
| 4,790,050 A * | 12/1988 | Ishii | A44B 19/262 24/419 |
| 4,935,996 A | 6/1990 | Ferrara | |
| 4,944,072 A * | 7/1990 | Robson | A44B 19/16 24/585.12 |
| 5,369,854 A | 12/1994 | Stephens | |
| 5,671,516 A * | 9/1997 | Sartori | A44B 11/2515 24/579.11 |
| 5,878,467 A * | 3/1999 | Yokota | A44B 19/262 24/265 EE |
| 6,009,604 A * | 1/2000 | Fildan | A41F 1/006 24/318 |
| 6,487,759 B1 * | 12/2002 | Akeno | A44B 11/2592 24/30.5 L |
| 7,238,081 B2 * | 7/2007 | Fildan | A41F 15/002 450/86 |
| 7,480,967 B2 * | 1/2009 | Kojoori | A44B 11/006 2/322 |
| 7,814,567 B2 * | 10/2010 | Dovner | F41H 1/02 2/2.5 |
| 8,359,716 B2 * | 1/2013 | Fiedler | A44B 11/25 24/303 |
| 2009/0094809 A1 * | 4/2009 | Kung | A44B 11/25 24/625 |
| 2014/0332572 A1 * | 11/2014 | Buerck | F41H 1/02 223/111 |

FOREIGN PATENT DOCUMENTS

| | | | | |
|---|---|---|---|---|
| FR | 2290860 A1 | 6/1976 | | |
| GB | 663482 A | * 12/1951 | ............ | A45D 6/185 |
| GB | 2079359 A | 1/1982 | | |

* cited by examiner

LOCKING CONNECTOR ASSEMBLY

RELATED APPLICATIONS

This application is a National Phase of International Application Number PCT/US2013/021675 filed Jan. 16, 2013 and relates to and claims priority benefits from U.S. Provisional Patent Application No. 61/587,751 entitled "Locking Buckle Assembly," filed Jan. 18, 2012, which is hereby incorporated by reference in its entirety.

FIELD OF EMBODIMENTS OF THE DISCLOSURE

Embodiments of the present disclosure generally relate to a connector assembly, and, more particularly, to a locking connector assembly such as a locking buckle or pipe lock assembly configured to securely connect separate and distinct components together.

BACKGROUND

Various components are connected together through connectors, such as buckles. For example, one component may include a male buckle member, while another component may include a female buckle member. The male buckle and female buckle members may be connected together in order to securely connect the two components together. The male and female buckle members may be manipulated in order to disconnect the female and male buckle members. Accordingly, the two components may be selectively connected and disconnected from one another through the male and female buckle members.

However, in various situations, the female and male buckle members may be inadvertently disconnected from one another. For example, the connection interface between the buckle members may not be robust enough to withstand forces of a certain magnitude, such as when dropped.

Additionally, many assemblies may be difficult to disconnect. For example, many assemblies may require fine motor skills to disconnect one connecting member from another. As such, the assemblies may be difficult to manipulate by certain individuals.

Further, typical assemblies are configured to mate in a particular direction. However, a user may find it difficult to securely connect parts of an assembly when one or both connecting parts of an assembly are secured to one or more components in particular orientations.

SUMMARY OF EMBODIMENTS OF THE DISCLOSURE

Certain embodiments of the present disclosure provide a locking connector assembly configured to securely connect a first component to a second component. The locking connector assembly may include a female connector having first and second female ends and a longitudinal passage defined therebetween, and a male connector having first and second male ends. Either of the first or second male ends is configured to mate with the female connector at either the first or second female ends in order to securely connect the male connector to the female connector.

In an embodiment, the female connector may include a longitudinal passage having a tab operatively connected to a male-engaging member. The male connector may include a female-engaging member configured to be slid into the longitudinal passage and retained in a connected state. The male connector may also include a recessed area configured to receive and retain the male-engaging member in the connected state. The tab may be configured to be manipulated to disengage the male engaging member from the recessed area in order to disconnect the male connector from the female connector. The tab may also include an overstop protuberance configured to abut into a portion of the female connector to limit movement of the tab.

The male-engaging member of the female connector may also include lateral walls and the female-engaging member of the male connector may include insert members separated by the recessed area. The lateral walls may be configured to be securely retained between the insert members in the connected state. The male engaging member may also include a protuberance, and the female-engaging member may also include a reciprocal ridge. The protuberance securely abuts into the reciprocal ridge in the connected state.

Each of the insert members may include a D-shaped axial cross-section. The longitudinal passage may include a reciprocal axial cross-section that conforms to the D-shaped axial cross-section.

One or both of the male and female connectors may include a web-retaining plate having at least one channel configured to receive and retain a web member. The channel(s) may be surrounded by a raised rim that provides structural support around the channel(s). Additionally, the female connector may include one or more strengthening ribs.

One of the male or female connectors may include securing portions and the other of the male or female connectors may include undercut portions. The securing portions may be configured to securely mate into the undercut portions in the connected state.

In an embodiment, the female connector defines a longitudinal passage. The male connector may include a female-engaging member configured to be slidably retained within the longitudinal passage. The male connector may include lead-in noses at the first and second male ends. Each of the lead-in noses may include a rearwardly-directed deflectable beam configured to be manipulated to disconnect the male connector from the female connector.

The rearwardly-directed deflectable beam may include a distal end that abuts an internal edge of the female connector when the male connector is connected to the female connector. The distal end may be configured to be urged in a direction that allows the rearwardly-directed deflectable beam to be slid into the longitudinal passage.

Certain embodiments of the present disclosure provide a locking connector assembly that may include a first connection member having a first housing, a second connection member having a second housing, and a securing member configured to slidably pass into at least one of the first and second connection members. The securing member may be configured to securely connect the first connection member to the second connection member in a connected state. The securing member may include at least one end configured to be manipulated in order to disconnect the first connection member from the second connection member.

In an embodiment, the securing member may be separate and distinct from the first and second connection members. The securing member may include at least one end having at least one securing post separated from at least one stabilizing post. The barb(s) extends from the securing post(s). The stabilizing post(s) and the securing post(s) are configured to be squeezed together in order to disconnect the first connection member from the second connection member.

In an embodiment, the securing member may include a longitudinal beam with a central collar extending around a middle of the longitudinal beam. A first securing post and a first stabilizing post may extend from a first end of the longitudinal beam. A second securing post and a second stabilizing post may extend from a second end of the longitudinal beam.

Each of the first and second housings may include an inner opening connected to an outer reduced-diameter opening by a longitudinal passage.

The securing member may be integrally formed with the second connection member. The securing member may include a base connected to a planar beam longitudinally extending from the second housing. The planar beam connects to a securing prong configured to securely connect the first connection member to the second connection member. The planar beam may be deflectable in order to allow the first connection member to be disconnected from the second connection member. In an embodiment, the base may be configured to rotate within a longitudinal passage of the first housing. In another embodiment, the base may be prevented from rotating within the longitudinal passage.

Figure 1:
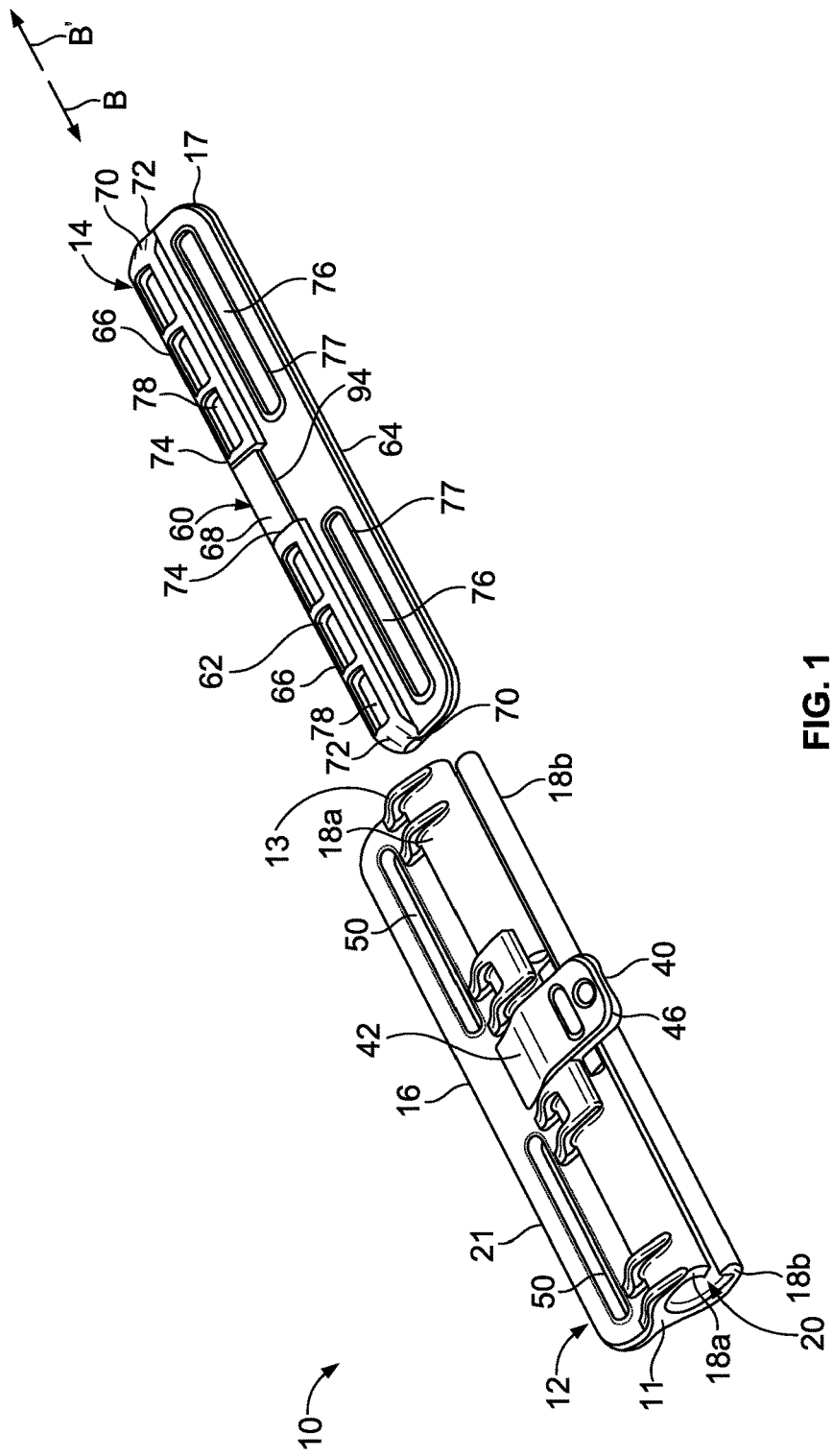
FIG. 1 illustrates an isometric top view of a locking connector assembly in a disconnected state, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

FIG. 1 illustrates an isometric top view of a locking connector assembly 10 in a disconnected state, according to an embodiment of the present disclosure. The locking connector assembly 10 includes a first or female connector 12 configured to mate with a second or male connector 14. The female and male connectors 12 and 14 may be buckle members and/or pipe lock members, for example. The female connector 12 has opposite ends 11 and 13. The male connector 14 has opposite ends 15 and 17. The male connector 14 is configured to securely mate with the female connector 12 such that either the end 15 or 17 may mate into either end 11 or 13.

Each of the female connector 12 and the male connector 14 may be integrally molded and formed as a single unit. For example, each of the female and male connectors 12 and 14 may be formed of a resilient material, such as injection-molded plastic.

The female connector 12 includes a main body 16 having opposed retaining arms 18a and 18b extending from a web-retaining plate 21. Each retaining arm 18a and 18b may be or include a clamp, prong, wall, or the like. A longitudinal passage 20 is defined between the opposed retaining arms 18a and 18b.

Figure 2:
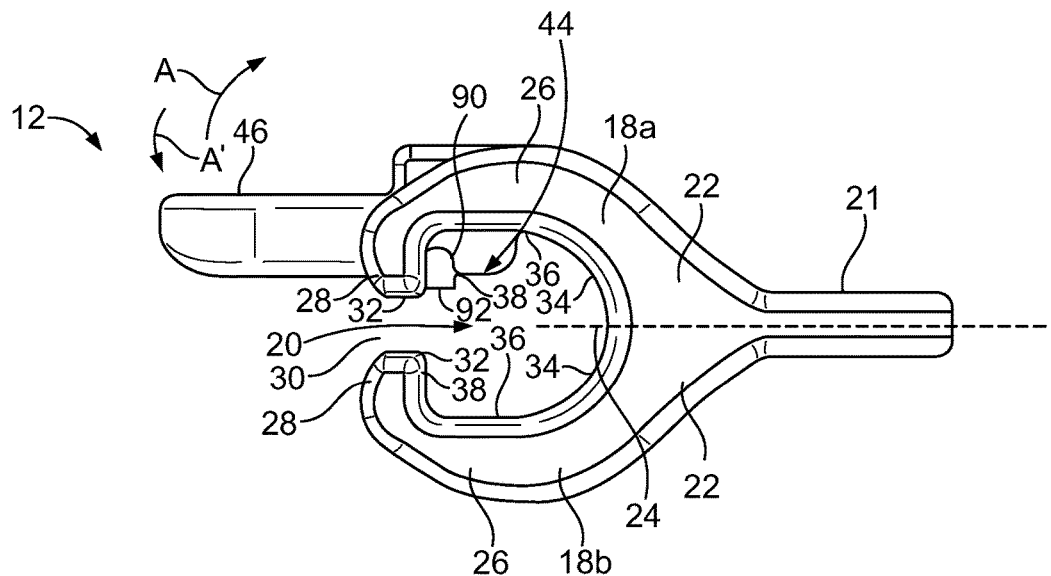
FIG. 2 illustrates an end view of a female connector, according to an embodiment of the present disclosure.

FIG. 2 illustrates an end view of the female connector 12. Each retaining arm 18a and 18b includes a base 22 that connects to the web-retaining plate 21. The bases 22 separate from one another about a central lateral axis 24 of the female connector 12. Each base 22 connects to an extension beam 26, which, in turn, connects to a retaining beam 28. A gap 30 is defined between free ends 32 of the retaining beams 28. The opposed retaining arms 18a and 18b may be configured to flex toward and away from one another about the bases 22.

Each retaining arm 18a and 18b includes curved, arcuate interior base surfaces 34 that integrally connect to linear extension surfaces 36. The linear extension surfaces 36, in turn, connect to linear retaining surfaces 38. The linear retaining surfaces 38 and the linear extension surfaces 36 may generally be perpendicular with one another. Accordingly, as shown, the longitudinal passage 20 may be defined by a D-shaped axial cross-section. Optionally, the retaining arms 18a and 18b may be sized and shaped differently, thereby defining a longitudinal passage 20 having other axial cross-sections, such as circular, square, rectangular, or the like.

Referring to FIGS. 1 and 2, the female connector 12 also includes a central tab 40 positioned on the retaining arm 18a. Optionally, the tab 40 may be positioned on the retaining arm 18b. Alternatively, both the retaining arms 18a and 18b may include a tab.

The central tab 40 extends outwardly from the retaining arm 18a and includes a connection beam 42 that connects to the web-retaining plate 21. The connection beam 42, in turn, connects to a male-engaging member 44, such as block and/or a locking tooth, barb, or other such protuberance. The male-engaging member 44 is configured to securely engage reciprocal features of the male connector 14. A planar pull beam 46 outwardly extends from the male-engaging member 42. The pull beam 46 extends linearly past an outer surface of the retaining arm 18a, and is generally parallel with the lateral axis 24. The pull beam 46 is configured to be pulled upwardly in the direction of arc A and pivot upwardly to move the male-engaging member 42 in a similar path.

As shown in FIG. 1, the tab 40 is generally centered about a midpoint of the retaining arm 18a. However, the tab 40 may be positioned at various other points along the retaining arm 18a.

Referring again to FIG. 1, the web-retaining plate 21 may be a generally planar, plate-like member having one or more channels 50 formed therethrough. The channels 50 may be parallel to the longitudinal passage 20. The channels 50 may be configured to receive and slidably retain web members, such as straps, ribbons, belts, or the like, that are configured to secure the female connector 12 to a component, such as a backpack, bag, structural feature, such as a door, or various other components. Alternatively, the web-retaining plate 21 may not include channels 50. Instead, the web-retaining plate 21 may be a planar panel configured to be secured to a component. For example, the planar panel may be secured to a component through fasteners, adhesives, or the like.

The male connector 14 includes a main body 60 including a female-engaging member 62, such as a beam, column, pipe, or the like, integrally connected to a web-retaining plate 64. The male connector 14 may be a longitudinal beam, pipe, shaft, or the like that is configured to be inserted and secured within the longitudinal passage 20 of the female connector 12.

The male connector 14 includes longitudinally aligned insert members 66 separated by a recessed area 68, such as a planar surface. The recessed area 68 is configured to be engaged by the male-engaging member 42 (shown in FIG. 2) of the female connector 12. The insert members 66 are sized and shaped to conform to the shape of the longitudinal passage 20 (shown in FIG. 2, for example) of the female connector 12. The insert members 66 may be tubular, partially tubular, D-shaped, circular, or the like.

Each insert member 66 includes a lead-in nose 70 at a terminal end 72. Each lead-in nose 70 may be beveled, sloped, rounded, or the like. Internal ends 74 of the insert members 66 may be blunted and straight. The beveled lead-in noses 70 allow the insert members 66 to be easily inserted into the female connector 12. The beveled lead-in noses 70 are configured to automatically center and align the female-engaging member 62 within the longitudinal passage 20 of the female connector 12.

Similar to the female connector 12, the web-retaining plate 64 of the male connector 14 may be a generally planar plate-like member having one or more channels 76 formed therethrough. The channels 76 may be parallel to the female-engaging member 62. The channels 76 are configured to receive and slidably retain web members, such as straps, ribbons, belts, or the like, that are configured to secure the male connector 14 to a component, such as a backpack, bag, or various other components. Alternatively, the web-retaining plate 64 may not include channels 76. Instead, the web-retaining plate 64 may be a planar sheet configured to be secured to component. For example, the planar sheet may be secured to a component through fasteners, adhesives, or the like.

Raised rims 77 may surround each channel 76. The rims 77 add strength to the areas of the web-retaining plate 64 that define the channels 76, as well as the web-retaining plate 64. The rims 77 protect the web-retaining plate 64 from cracking under exerted pressure from web members. While not shown, the web-retaining plate 21 of the female connector 12 may also include raised rims about the web channels 50.

Recesses 78, such as grooves, cavities, divots, or the like, may be formed through each insert member 66. The recesses 78 decrease the amount of material used for the male connector 14, thereby reducing weight. The recesses 78 may be smaller or larger than shown in FIG. 1. Additionally, more or less recesses 78 may be formed through the insert members 66.

Figure 3:
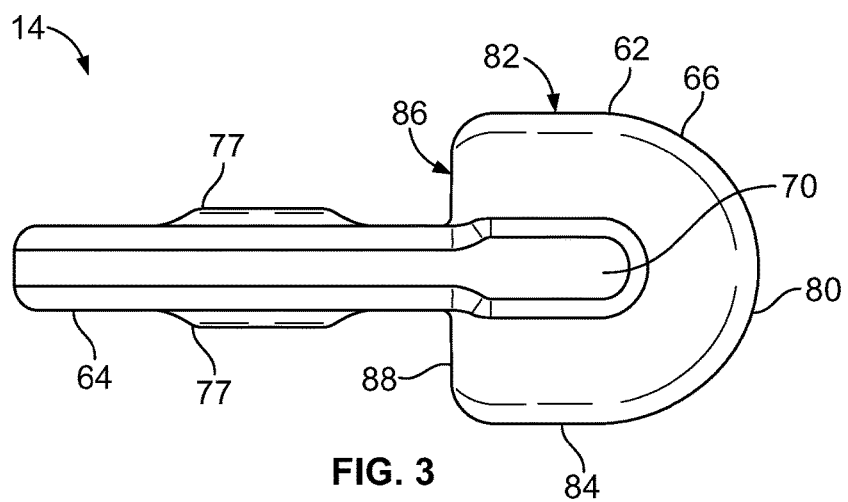
FIG. 3 illustrates an end view of a male connector, according to an embodiment of the present disclosure.

FIG. 3 illustrates an end view of the male connector 14, according to an embodiment of the present disclosure. As shown, each insert member 66 includes a generally arcuate outer surface 80 that integrally connects to generally linear top and bottom surfaces 82 and 84, respectively. The top and bottom surfaces 82 and 84, in turn, integrally connect to linear inner surfaces 86 and 88, respectively, which are generally perpendicular to the linear top and bottom surfaces 82 and 84. As shown, the insert members 66 may include a generally D-shaped cross-section that is configured to be received and retained within the longitudinal passage 20 of the female connector 12 (shown in FIGS. 1 and 2). The insert members 66 may be shaped and sized to conform to the shape of the longitudinal passage 20.

Referring to FIGS. 1-3, in order to connect the male connector 14 to the female connector 12, a lead-in nose 70 of one of the insert members 66 is longitudinally and axially aligned with the longitudinal passage 20 of the female connector 12. After being aligned, the lead-in nose 70 is urged into the longitudinal passage 20 in the direction of arrow B (shown in FIG. 1). As the insert member 66 passes into the longitudinal passage 20, the interior base surfaces 34, the linear extension surfaces 36, and the linear retaining surfaces 38 of the female connector 12 slide and conform over the arcuate outer surface 80, linear surfaces 82, 84, and linear inner surfaces 86, 88, respectively, of the male connector 14. As the insert member 66 continues to be urged into the longitudinal passage 20 in the direction of arrow B, the insert member 66 encounters the male-engaging member 44. With increased urging in the direction of arrow B, the insert member 66 deflects the male-engaging member 44 upwardly in the direction of arc A (shown in FIG. 2). Notably, a user does not need to pull upward on the pull beam 46 during the connection process, as the insert member 66 automatically deflects the male-engaging member 44 upward.

The male-engaging member 44 continues to be upwardly deflected as the leading insert member 66 continues to slide under the male-engaging member 44. Once the male connector 14 is urged into the direction of arrow B (shown in FIG. 1) such that the recessed area 68 is completely under the male-engaging member 44, the male-engaging member 44 flexes back down in the direction of arc A' (shown in FIG. 2) to its at-rest position. In this position, lateral walls 90 of the male-engaging member 44 are trapped between the blunted internal ends 74 of the insert members 66. Further, a protuberance 92 (shown in FIG. 2), such as a latching beam, ridge, ledge, or the like, of the female connector 12 may securely abut into a reciprocal ridge 94 of the recessed area 68. As such, the male-engaging member 44 securely locks the male connector 14 to the female connector 12. Because the male-engaging member 44 is trapped between the blunted internal ends 74 of the insert member 66, the male connector 14 is prevented from axially shifting in the directions of arrows B and B' with respect to the female connector 12. Further, because the distal protuberance 92 of the male-engaging member 44 securely latches to the reciprocal ridge 94 of the recessed area 68, the male connector 14 is prevented from ejecting through the gap 30 between the retaining beams 28 (shown in FIG. 2) of the female connector 12. Additionally, the retaining beams 28 abut the insert members 66 and ensure that the male connector 14 does not eject from the female connector 12.

The male connector 14 may be inserted into the longitudinal passage 20 of the female connector 12 from either end 11 or 13. Additionally, either end 15 or 17 of the male connector 14 may be inserted into either end 11 or 13 of the female connector 12. Accordingly, the female and male connectors 12 and 14 may connect (and disconnect) in a bi-directional fashion. Because the female and male connectors 12 and 14 may connect to each other in a bi-directional fashion, a user may quickly and easily connect the female and male connectors 12 and 14 together as the connection does not occur in just one direction and orientation.

Figure 4:
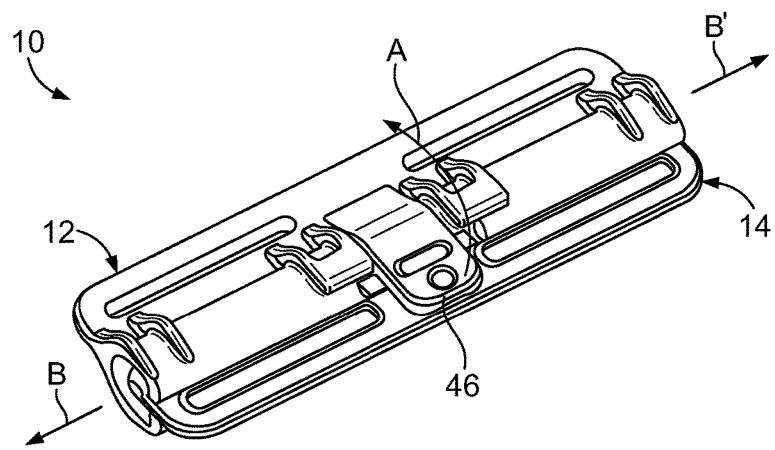
FIG. 4 illustrates an isometric top view of a locking connector assembly in a connected state, according to an embodiment of the present disclosure.

FIG. 4 illustrates an isometric top view of the locking connector assembly 10 in a connected state, according to an embodiment of the present disclosure. The D-shaped interface between the female-engaging member 62 of the male connector 14 and the retaining arms 18a and 18b of the female connector 12 cooperate to prevent the male buckle member 14 from rotating within the longitudinal channel 20 of the female connector 12. For example, the linear interfaces between the female-engaging member 62 and the retaining arms 18a and 18b prevent the female-engaging member 62 from rotating within the longitudinal passage 20. In order to disconnect the male connector 14 from the female connector 12, a user pulls up on the pull beam 46 in the direction of arc A. As shown, the direction of pull in the direction of arc A may generally be radial with respect to the axial cross section of the longitudinal passage 20. With increased urging in the direction of arc A, the male-engaging member 44 disengages from the blunted internal ends 74 of the insert member 66, and the distal protuberance 92 of the male-engaging member 44 disengages from the reciprocal ridge 94 of the recessed area 68. With the pull beam 46 remaining in the upward, pivoted state, the male connector 14 may then be slid out of the female connector 12 in either direction denoted by arrows B or B'.

Figure 5:
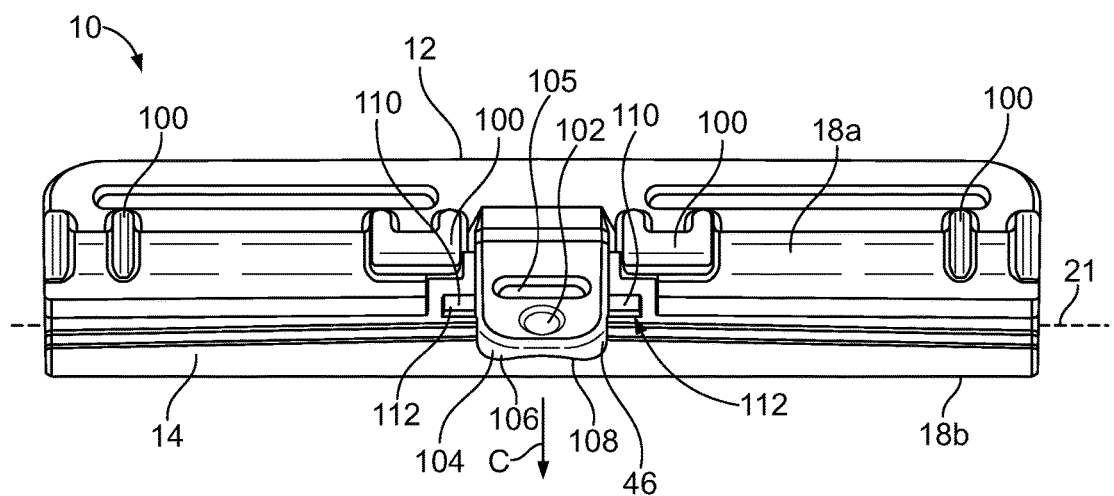
FIG. 5 illustrates an isometric front view of a female connector, according to an embodiment of the present disclosure.

FIG. 5 illustrates an isometric front view of the female connector 12. The female connector 12 may also include one or more strengthening ribs 100 that surround a portion of the retaining arms 18a or 18b. As shown in FIG. 5, each strengthening rib 100 may generally surround an arcuate portion of the retaining arm 18a or 18b. The strengthening ribs 100 may reside in planes that are generally perpendicular to the longitudinal passage 20. The strengthening ribs 100 strengthen the retaining arms 18a and 18b. The strengthening ribs 100 prevent the male connector 14 from overly separating the retaining arms 18a and 18b, and thereby prevent the male connector 14 from ejecting from the female connector 12 in the direction of arrow C. More or less strengthening ribs 100 than those shown may be used. For example, a strengthening layer may be positioned over an entire surface of the retaining arms 18a and 18b.

The pull beam 46 may also include a hole 102 formed near a distal end 104. The hole 102 is configured to receive a cord that may be used to pull the pull tab 46. Additionally, an underside 106 of the pull tab 46 may include a recessed area 108 that may be ergonomically configured to receive a thumb or finger of a user, so that the user may comfortably engage the pull beam 46. The pull tab 46 may also include a slot 105 formed therethrough. The slot 105 may also be configured to receive a pull cord, for example.

Additionally, an overstop protuberance 110, such as a crossbeam, one or more tabs, or the like, may extend cross-wise underneath the pull tab 46. The overstop protuberance 110 may include lateral stops 112, such as tabs or end portions, which extend laterally outward from the pull beam 46. The lateral stops 112 are positioned underneath wall portions of the retaining arm 18a, such as underneath a portion of ribs 100. Thus, when the pull beam 46 is upwardly pulled, the lateral stops 112 abut into the portions of the ribs 100, which prevent the lateral stops 112, and therefore the pull tab 46, from further upward movement. The interaction between the lateral stops 112 and the portions of the ribs 100 prevent the pull tab 46 from being moved past a breaking point. Thus, the pull beam 46 is protected from being snapped or otherwise damaged.

The overstop protuberance 110 may be a linear beam that spans across the underside of the pull beam 46. Alternatively, the overstop protuberance 110 may include separate and distinct tabs extending laterally outward from the underside and/or lateral surfaces of the pull beam 46. More or less overstop protuberances 110 than shown may be used.

Figure 6:
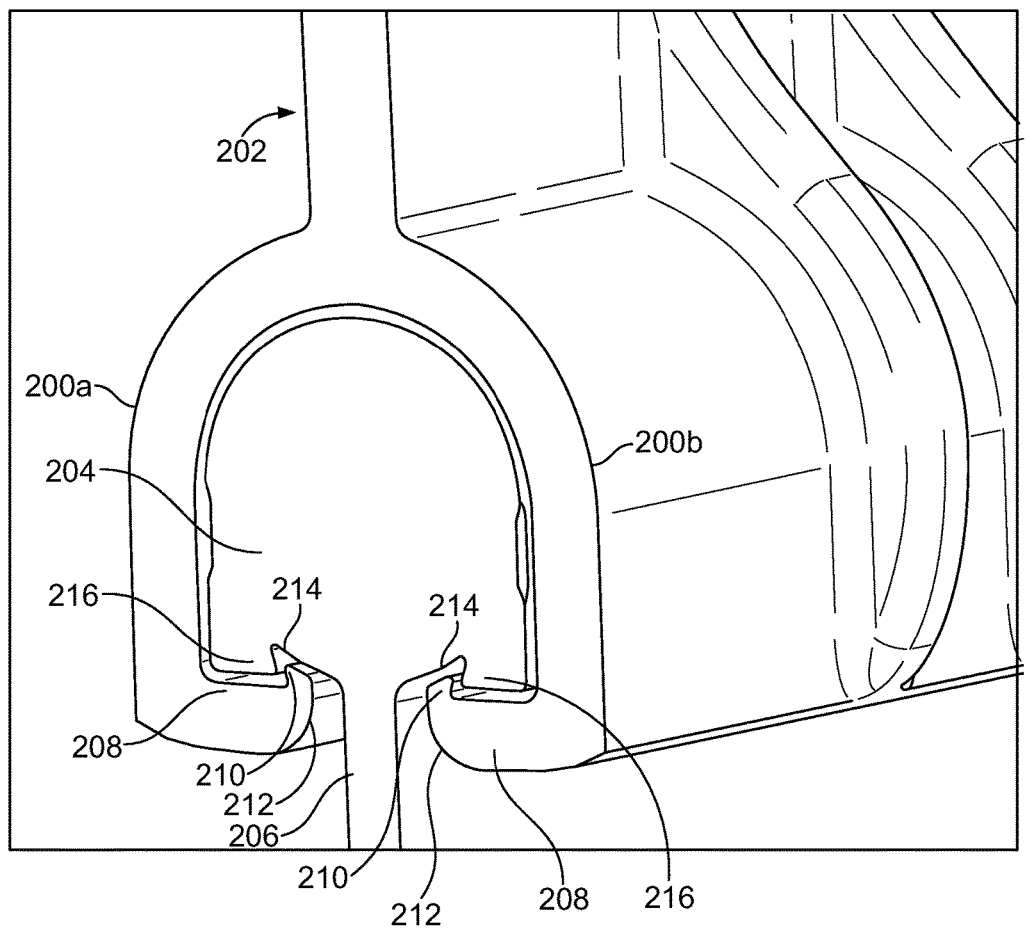
FIG. 6 illustrates an isometric end view of retaining arms of a female connector securely retaining a female-engaging member of a male connector, according to an embodiment of the present disclosure.

FIG. 6 illustrates an isometric end view of retaining arms 200a and 200b of a female connector 202 securely retaining a female-engaging member 204 of a male connector 206, according to an embodiment of the present disclosure. The female and male connectors 202 and 206 are similar to those described above, except that linear extension surfaces 208 of each retaining arm 200a, 200b include securing portions 210, such as hooks, teeth, barbs, or the like, extending from distal ends 212. The securing portions 210 are configured to be received in reciprocal undercut channels 214 formed through inner surfaces 216 of the male connector 206. The securing portions 210 are configured to securely mate with the undercut channels 214 in order to provide a secure, robust connection between the retaining arms 200a, 200b and the female-engaging member 204.

Figure 7:
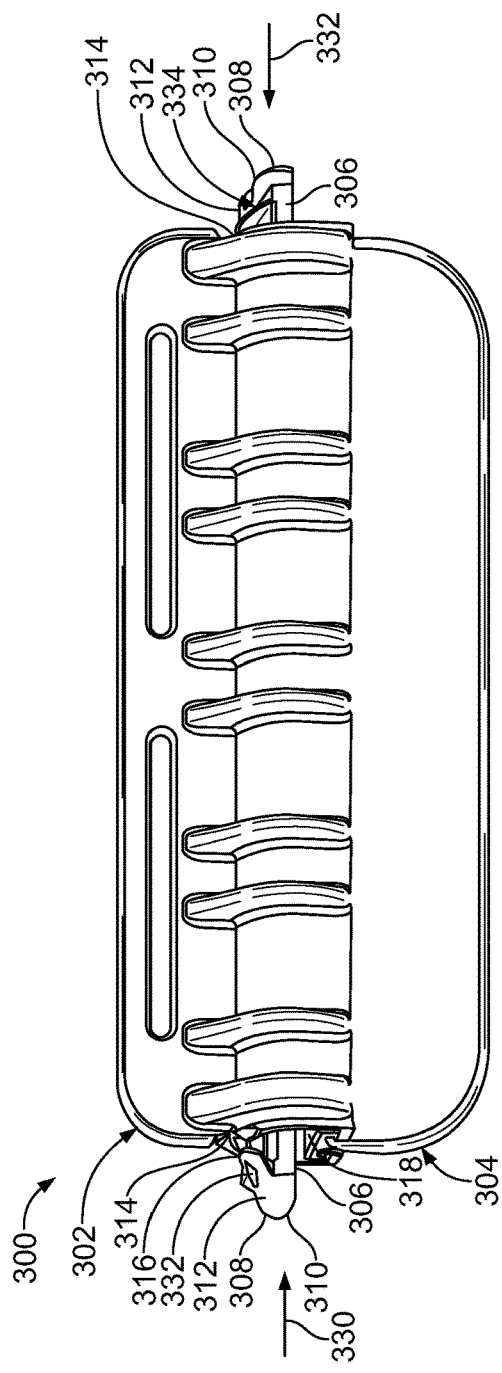
FIG. 7 illustrates an isometric top view of a locking connector assembly in a connected state, according to an embodiment of the present disclosure.

FIG. 7 illustrates an isometric top view of a locking connector assembly 300 in a connected state, according to an embodiment of the present disclosure. The assembly 300 includes a female connector 302 configured to receive a male connector 304. The male connector 304 includes a female-engaging member 306 having a lead-in nose 308 at either end 310. Each lead-in nose 308 is connected to a rearwardly-directed deflection beam 312 that is directed back away from a longitudinal axis of the female-engaging member and toward an interior edge 314 of the female connector 302. Each deflection beam 312 includes a distal end 316 that is disposed above a longitudinal passage 318 of the female connector 302. As such, in the connected state, the distal ends 316 abut into the interior edges 314, thereby preventing the male connector 304 from axially shifting with respect to the female connector 302 in the directions of arrows 330 or 332.

In order to disconnect the male connector 304 from the female connector 302, one or both of the deflection beams 312 is pushed, squeezed, compressed, or the like, in the direction of arrows 330 or 332. When the deflection beam(s) 312 is pushed, squeezed, compressed, or otherwise moved toward the longitudinal axis of the female-engaging member 306, the deflection beam(s) 312 is able to fit within the longitudinal passage 318, and is pushed or pulled into the longitudinal passage 318. The male connector 304 is then slid out of the female connector 302.

In order to secure the male connector 304 to the female connector 302, one of the lead-in noses 308 is aligned with the longitudinal passage 318 and urged therein. As the lead-in nose 308 is urged inward, the walls defining the longitudinal passage 318 bend the deflection beam 312 down, so that the female-engaging member 306 may be slid therein. Once the deflection beam 312 exits the longitudinal passage 318 on the other side of the female connector 302, the deflection beam 312 deflects back to its at-rest position, in which it is unable to pass into the longitudinal passage 318. Accordingly, the opposed deflection beams 312 ensure that the male connector 304 is secured to the female connector 302.

Figure 8:
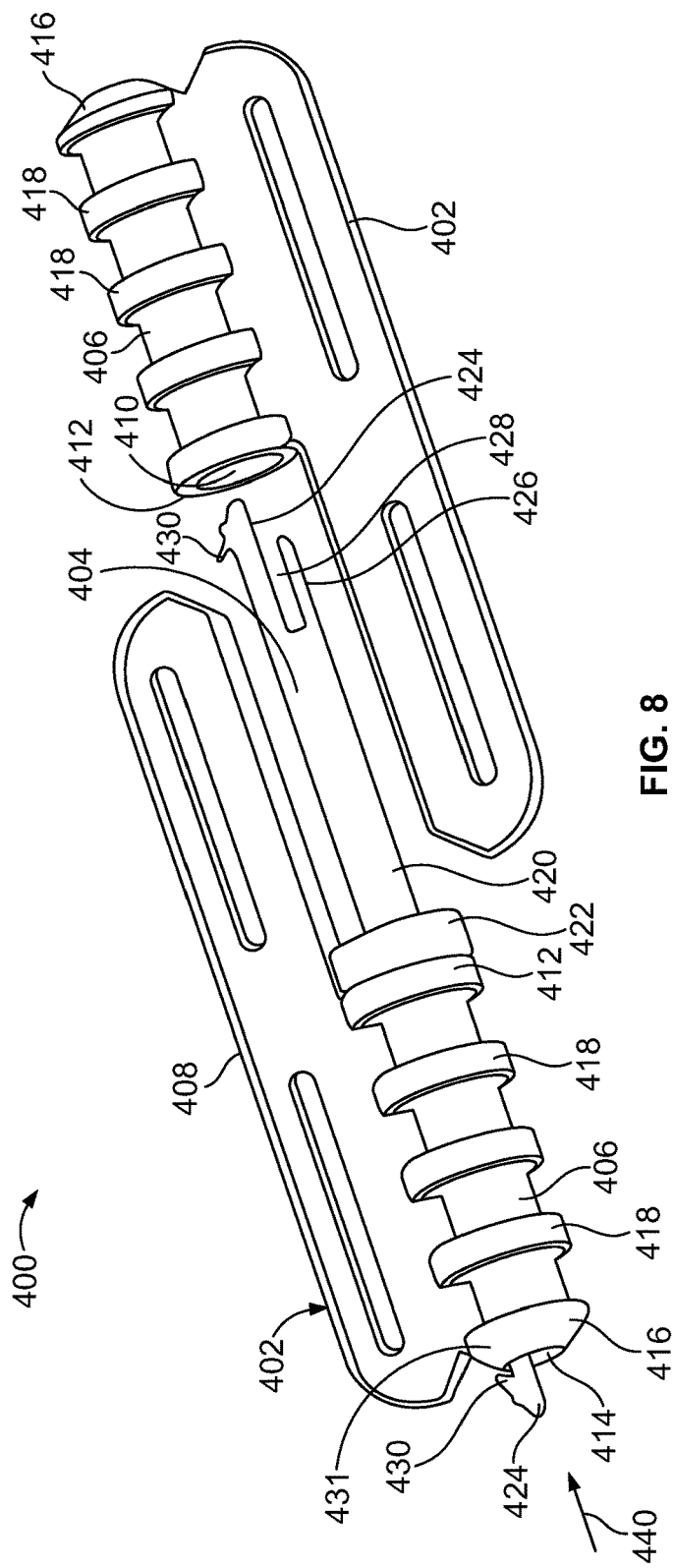
FIG. 8 illustrates an isometric top view of a locking connector assembly in a partially disconnected state, according to an embodiment of the present disclosure.

FIG. 8 illustrates an isometric top view of a locking connector assembly 400 in a partially disconnected state, according to an embodiment of the present disclosure. The assembly 400 includes opposed connection members 402, such as first and second connection members, and a securing member 404 that is configured to securely connect the connection members 402 together.

Each connection member 402 includes a retaining housing 406 connected to a web-retaining plate 408. The retaining housing 406 may be disposed at an end of the web-retaining plate 408 (or a planar sheet or panel). Optionally, the retaining housing 406 may generally connect to a central region of the web-retaining plate 408.

The retaining housing 406 may be a cylindrical housing having an opening 410 formed through an inner end 412. The opening 410 connects to a reduced-diameter opening 414 at an opposite end 416. The openings 410 and 414 connect to one another through an internal longitudinal passage (hidden from view). Strengthening ribs 418 may surround portions of the retaining housing 406.

The securing member 404 includes a longitudinal beam 420 with a central collar 422 positioned around a center of the beam 420. Securing posts 424 and stabilizing posts 426 longitudinally extend from each end of the securing member 404. A longitudinal space 428 is defined between interior surfaces of each securing post 424 and each stabilizing post 426. A rearwardly-directed barb 430 extends from each securing post 424.

In order to connect the opposed connection members 402 together, an end of the securing member 404 is urged into one of the openings 410. As the securing member 404 is urged into the opening 410, the securing post 424 and stabilizing post 426 deflect toward one another into the longitudinal space 428. As such, the securing post 424 and the stabilizing post 426 pass through the longitudinal passage of the retaining housing 406. The securing member 404 continues to be urged into the retaining housing 406 until the central collar 422 abuts into the inner end 412 that defines the opening 410. Because the central collar 422 has a larger diameter than the opening 410, the central collar 422 is unable to pass into the opening 410. At this time, the securing post 424 and the stabilizing post 426 pass out of the opening 414 and spring back to their at-rest positions. As such, the at-rest rearwardly-directed barb 430 provides a distance between the barb 430 and the stabilizing post 426 that is greater than the opening 414. If an attempt is made to move the securing member 404 inwardly into the opening 414, such as in the linear direction 440, the barb 430 catches on the edge 431, for example, of the retaining housing 406, thereby preventing the securing member 404 from moving into the opening 414.

After the securing member 404 is secured to one of the retaining housings 406, the other retaining housing 406 is secured to the other end of the securing member 404 in a similar fashion. Accordingly, the connection members 402 are securely connected to one another through the separate and distinct securing member 404.

In order to disconnect the connection members 402 from one another, a user squeezes, pinches, or otherwise deflects the exposed securing post 426 downwardly toward an interior of the opening 414 so that the barb 430 may be able to pass into the opening 414. During this movement, the user pulls on the opposite connection member 402 to pull the securing member 404 out of the other connection member 402, leaving a connection member 402 with about half of the securing member 404 extending therefrom. The securing member 404 may then be removed from the remaining connection member 402 by squeezing, pinching, or otherwise deflecting the securing post 426 extending through the opening 414, as noted above, and then pulling on the exposed half of the securing member 404 to pull the securing member 404 out of the retaining housing 406.

Optionally, the securing member 404 may be integrally and permanently secured to, or an integrally molded and formed part of, one of the connection members 402. For example, one of the retaining housings 406 may simply include a beam having a securing post and a stabilizing post extending longitudinally therefrom. Thus, instead of three pieces, the locking connector assembly 400 may include two pieces.

Figure 9:
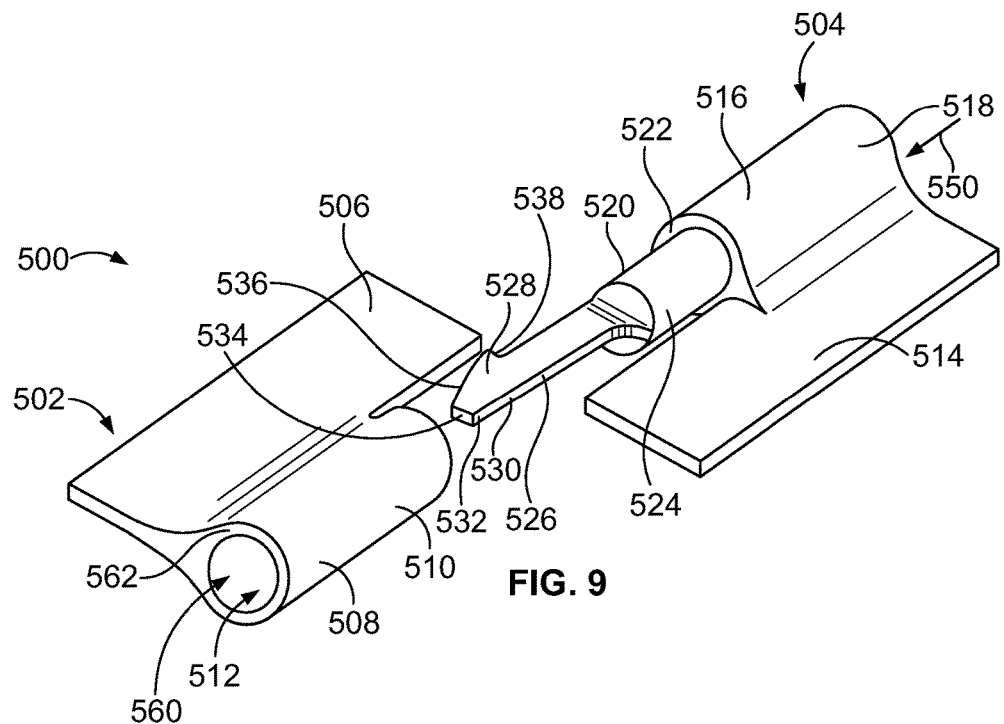
FIG. 9 illustrates an isometric top view of a locking connector assembly in a disconnected state, according to an embodiment of the present disclosure.

FIG. 9 illustrates an isometric top view of a locking connector assembly 500 in a disconnected state, according to an embodiment of the present disclosure. The assembly 500 includes a first or female connector 502 and a second or male connector 504. The female connector 502 and male connector 504 may connect and cooperate to form a hinge, for example.

The female connector 502 includes a retaining plate 506 connected to a receiving housing 508. The retaining plate 506 may be a flat plate configured to be secured to a component. For example, the retaining plate 506 may be secured to a component through fasteners, such as screws, bolts, or the like, or adhesives. Optionally, the retaining plate 506 may be sewn to an article. Alternatively, the retaining plate 506 may be a web-retaining plate, as shown and described with respect to FIG. 1, for example. The receiving housing 508 includes a generally cylindrical main body 510 defining a longitudinal passage 512 formed therethrough.

The male connector 504 includes a retaining plate 514 connected to a male support housing 516. The retaining plate 514 may be a flat plate configured to be secured to a component. For example, the retaining plate 514 may be secured to a component through fasteners, such as screws, bolts, or the like, or adhesives. Optionally, the retaining plate 514 may be sewn to an article. Alternatively, the retaining plate 514 may be a web-retaining plate, as shown and described with respect to FIG. 1.

The male support housing 516 includes a main body 518 having a securing member 520 extending longitudinally from an internal end thereof. The securing member 520 may be integrally molded and formed with the male support housing 516. Alternatively, the male support housing 516 may be separately formed from the male support housing 516 and secured within a cavity formed in the main body 518.

The securing member 520 may include a base 522 sized and shaped to conform to the size and shape of the longitudinal passage 512. The base 522 may be cylindrical and the longitudinal passage 512 may form a cylindrical passage. In this manner, the base 522 may rotate within the longitudinal passage 512 (such as if used as a hinge). A planar beam 526 extends longitudinally outward from the base 522. A securing prong 528 is formed at a distal end 530 of the beam 526. The securing prong 528 includes a linear edge 532 that is generally longitudinally aligned and flush with the planar beam 526. The linear edge 532 connects to a linear tip 534, which may be perpendicular to the linear edge 532. The linear tip 534, in turn, connects to an outwardly-ramped surface 536, which, in turn, connects to a straight edge 538 that connects back to the planar beam 526. The straight edge 538 may be generally parallel with the linear tip 534 and perpendicular to the planar beam 526. In order to connect the male connector 504 to the female connector 502, the securing member 520 is longitudinally and axially aligned with the longitudinal passage 512. The male connector 504 is then urged toward the female connector 502 in the direction of arrow 550.

As the securing member 520 is urged into the longitudinal passage 512 in the direction of arrow 550, the ramped surface 536 slides under the edge of the housing 508 that defines an opening that connects to the longitudinal passage 512. The male connector 504 continues to be urged in the direction of 550, such that the securing prong 528 slides through the housing 508 within the longitudinal passage 512. As the securing prong 528 exits the opening, the base 522 secures within the longitudinal passage 512 and forces the straight edge 538 to hook over an edge 562 of the housing 508, thereby securely connecting the male connector 504 to the female connector 502.

Figure 10:
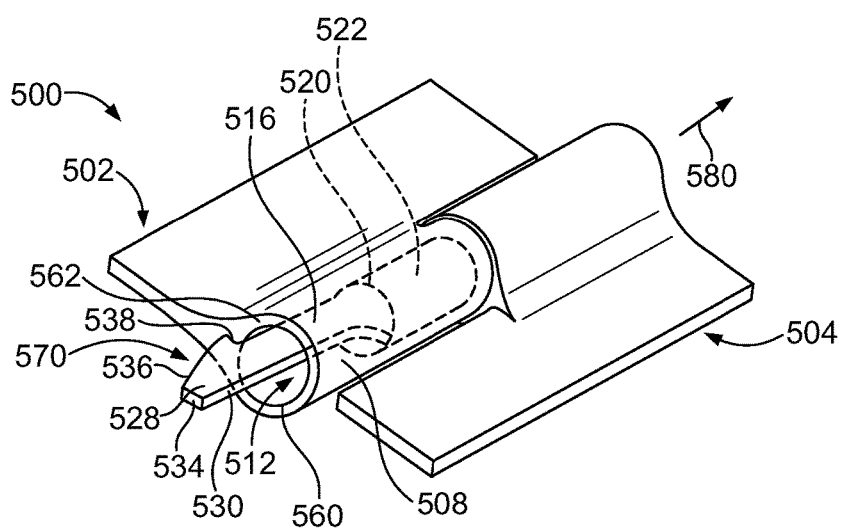
FIG. 10 illustrates an isometric top view of a locking connector assembly in a connected state, according to an embodiment of the present disclosure.

FIG. 10 illustrates an isometric top view of the locking connector assembly 500 in a connected state, according to an embodiment of the present disclosure. In order to disconnect the female connector 502 from the male connector 504, the securing prong 528 is urged in the direction of arrow 570, toward the opening 560. The securing member 520 may be formed of a flexible material (such as plastic, rubber, or the like) that allows the planar beam 526 to pivot about a junction with the base 522. Accordingly, the planar beam 526 pivots when the securing prong 528 is urged in the direction of 570, which disengages the straight edge 538 from the edge 562. Once the straight edge 538 clears the edge 562, the straight edge 538 and the rest of the securing prong 528 may be moved into the opening 560 and the longitudinal passage 512. Thus, the securing member 520 may be slid out of the longitudinal passage 512 in the direction of arrow 570, and the male connector 504 may be disconnected from the female connector 502.

Referring to FIGS. 1-10, embodiments of the present disclosure provide locking connector assemblies having high strength-to-weight ratios. Embodiments of the present disclosure provide locking connector assemblies that are easy to assemble, connect, and disconnect. Embodiments of the present disclosure provide locking connector assemblies that do not require fine motor skills to manipulate and operate. Indeed, embodiments of the present disclosure provide locking connector assemblies that may be easily manipulated and operated by a user, even if the user is wearing gloves.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

Various features of the disclosure are set forth in the following claims.

The invention claimed is:

1. A locking connector assembly configured to securely connect a first component to a second component, the locking connector assembly comprising:
   a female connector comprising:
      a main body having opposed retaining arms extending from a web-retaining plate, wherein a longitudinal passage is defined between the opposed retaining arms;
      a tab outwardly extending beyond a front edge of one of the opposed retaining arms; and
      a male-engaging member coupled to the tab, wherein the male-engaging member is distinct from the tab, and wherein the male-engaging member inwardly extends from the one of the opposed retaining arms into the longitudinal passage; and
   a male connector having first and second male ends, wherein either of the first or second male ends is configured to mate with the female connector at either the first or second female ends in order to securely connect the male connector to the female connector, wherein the male connector comprises a female-engaging member configured to be slid into the longitudinal passage and retained in a connected state.

2. The locking connector assembly of claim 1, wherein the male connector comprises a recessed area configured to receive and retain the male-engaging member of the female connector in the connected state, wherein the tab is configured to be manipulated to disengage the male engaging member from the recessed area in order to disconnect the male connector from the female connector.

3. The locking connector assembly of claim 2, wherein the tab comprises a connection beam that connects to the web-retaining plate, wherein the male-engaging member connects to the connection beam.

4. The locking connector assembly of claim 3, wherein a planar pull beam outwardly extends from the male-engaging member, wherein the pull beam extends linearly past an outer surface of the one of the opposed retaining arms, and wherein the pull beam is configured to be pulled to move the male-engaging member.

5. A locking connector assembly configured to securely connect a first component to a second component, the locking connector assembly comprising:
   a female connector having first and second female ends and a longitudinal passage defined therebetween, wherein the female connector comprises:
      a main body having opposed retaining arms extending from a web-retaining plate, the longitudinal passage being defined between the opposed retaining arms;
      a tab outwardly extending beyond a front edge of one of the opposed retaining arms; and
      a male-engaging member coupled to the tab, wherein the male-engaging member is distinct from the tab, and wherein the male-engaging member inwardly extends from the one of the opposed retaining arms into the longitudinal passage; and
   a male connector having first and second male ends, wherein either of the first or second male ends is configured to mate with the female connector at either the first or second female ends in order to securely connect the male connector to the female connector, wherein the male connector comprises:
- a female-engaging member configured to be slid into the longitudinal passage and retained in a connected state; and
- a recessed area configured to receive and retain the male-engaging member in the connected state, wherein the tab is configured to be manipulated to disengage the male engaging member from the recessed area in order to disconnect the male connector from the female connector.

6. The locking connector assembly of claim 5, wherein the male-engaging member further comprises lateral walls and the female-engaging member comprises insert members separated by the recessed area, wherein the lateral walls are configured to be securely retained between the insert members in the connected state.

7. The locking connector assembly of claim 6, wherein the male-engaging member further comprises a protuberance and the female-engaging member further comprises a reciprocal ridge, wherein the protuberance securely abuts into the reciprocal ridge in the connected state.

8. The locking connector assembly of claim 6, wherein each of the insert members comprises a D-shaped axial cross-section, and wherein the longitudinal passage comprises a reciprocal axial cross-section that conforms to the D-shaped axial cross-section.

9. The locking connector assembly of claim 5, wherein the web-retaining plate comprises at least one channel configured to receive and retain a web member.

10. The locking connector assembly of claim 9, wherein the at least one channel is surrounded by a raised rim that provides structural support around the at least one channel.

11. The locking connector assembly of claim 5, wherein the female connector comprises one or more strengthening ribs.

12. The locking connector assembly of claim 5, wherein the tab further comprises an overstop protuberance configured to abut into a portion of the female connector to limit movement of the tab.

13. The locking connector assembly of claim 5, wherein one of the male or female connectors comprises securing portions and the other of the male or female connectors comprises undercut portions, and wherein the securing portions are configured to securely mate into the undercut portions in the connected state.

14. The locking connector assembly of claim 5, wherein the tab comprises a connection beam that connects to the web-retaining plate, wherein the male-engaging member connects to the connection beam.

15. The locking connector assembly of claim 14, wherein a planar pull beam outwardly extends from the male-engaging member, wherein the pull beam extends linearly past an outer surface of the one of the opposed retaining arms, and wherein the pull beam is configured to be pulled to move the male-engaging member.

16. A locking connector assembly configured to securely connect a first component to a second component, the locking connector assembly comprising:
- a female connector having first and second female ends and a longitudinal passage defined therebetween, wherein the female connector comprises:
  - a main body having opposed retaining arms extending from a web-retaining plate having at least one channel configured to receive and retain a web member, wherein the at least one channel is surrounded by a raised rim that provides structural support around the at least one channel, the longitudinal passage being defined between the opposed retaining arms;
  - a tab outwardly extending beyond a front edge of one of the opposed retaining arms, wherein the tab comprises an overstop protuberance configured to abut into a portion of the female connector to limit movement of the tab, and a connection beam that connects to the web-retaining plate;
  - a male-engaging member coupled to the tab, wherein the male-engaging member connects to the connection beam, wherein the male-engaging member is distinct from the tab, and wherein the male-engaging member inwardly extends from the one of the opposed retaining arms into the longitudinal passage, wherein the male-engaging member comprises lateral walls and a protuberance, wherein a planar pull beam outwardly extends from the male-engaging member, wherein the pull beam extends linearly past an outer surface of the one of the opposed retaining arms, and wherein the pull beam is configured to be pulled to move the male-engaging member; and
  - one or more strengthening ribs; and
- a male connector having first and second male ends, wherein either of the first or second male ends is configured to mate with the female connector at either the first or second female ends in order to securely connect the male connector to the female connector, wherein the male connector comprises:
  - a female-engaging member configured to be slid into the longitudinal passage and retained in a connected state, wherein the female-engaging member comprises insert members and a reciprocal ridge, wherein each of the insert members comprises a D-shaped axial cross-section, wherein the longitudinal passage comprises a reciprocal axial cross-section that conforms to the D-shaped axial cross-section, wherein the protuberance securely abuts into the reciprocal ridge in the connected state; and
  - a recessed area configured to receive and retain the male-engaging member in the connected state, wherein the tab is configured to be manipulated to disengage the male engaging member from the recessed area in order to disconnect the male connector from the female connector, wherein the insert members of the female-engaging member are separated by the recessed area, wherein the lateral walls are configured to be securely retained between the insert members in the connected state.

* * * * *